US007030724B2

(12) United States Patent
Pedersen

(10) Patent No.: US 7,030,724 B2
(45) Date of Patent: Apr. 18, 2006

(54) METHOD AND APPARATUS FOR COIL-LESS MAGNETOELECTRIC MAGNETIC FLUX SWITCHING FOR PERMANENT MAGNETS

(76) Inventor: Brad D. Pedersen, c/o Patterson, Thuente, Skaar & Christensen, P.A., 4800 IDS Center, 80 S. 8th St., Minneapolis, MN (US) 55402

( * ) Notice: Subject to any disclaimer, the term of this patent is extended or adjusted under 35 U.S.C. 154(b) by 0 days.

(21) Appl. No.: 11/229,079

(22) Filed: Sep. 16, 2005

(65) Prior Publication Data

US 2006/0012453 A1    Jan. 19, 2006

Related U.S. Application Data

(63) Continuation of application No. 10/862,776, filed on Jun. 7, 2004, now Pat. No. 6,946,938.

(51) Int. Cl.
*H01F 21/08* (2006.01)

(52) U.S. Cl. ........................ 335/296; 336/155; 336/160
(58) Field of Classification Search ........ 335/296–306; 336/155–165; 361/147, 210
See application file for complete search history.

(56) References Cited

U.S. PATENT DOCUMENTS

| 4,806,858 | A  | * | 2/1989 | Elbicki | ........................ 324/205 |
| 6,246,561 | B1 | * | 6/2001 | Flynn   | ........................ 361/147 |
| 6,342,746 | B1 | * | 1/2002 | Flynn   | ........................ 310/181 |

* cited by examiner

*Primary Examiner*—Ramon M. Barrera
(74) *Attorney, Agent, or Firm*—Patterson, Thuente, Skaar & Christensen, P.A.

(57) ABSTRACT

Methods and apparatus that employ a coil-less magnetoelectric flux switch arrangement to repeatedly switch magnetic flux from at least one permanent magnet for the purposes of generating motive force and/or electrical energy.

4 Claims, 7 Drawing Sheets

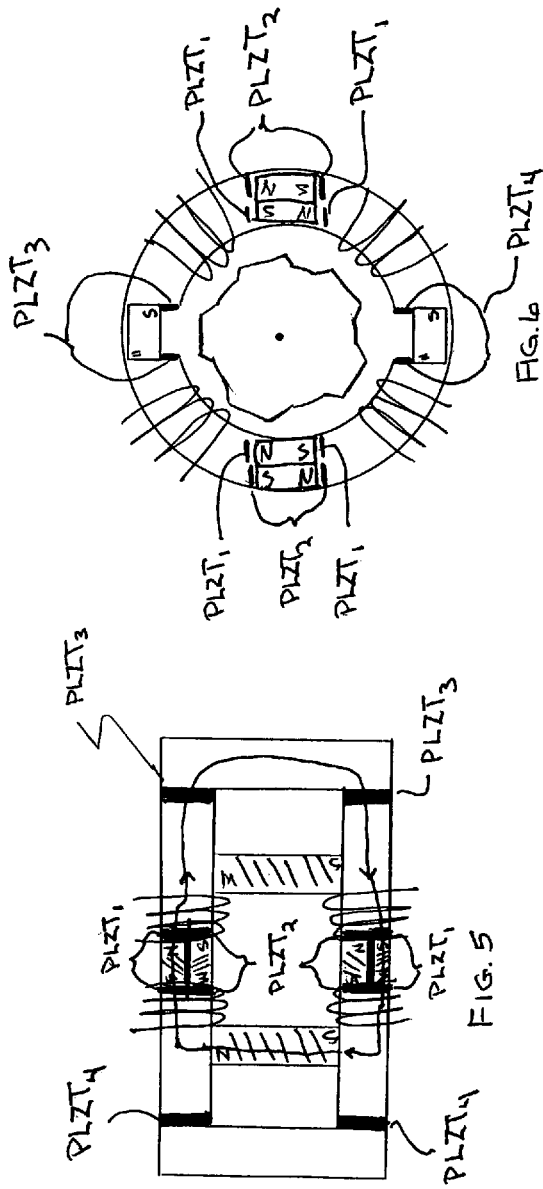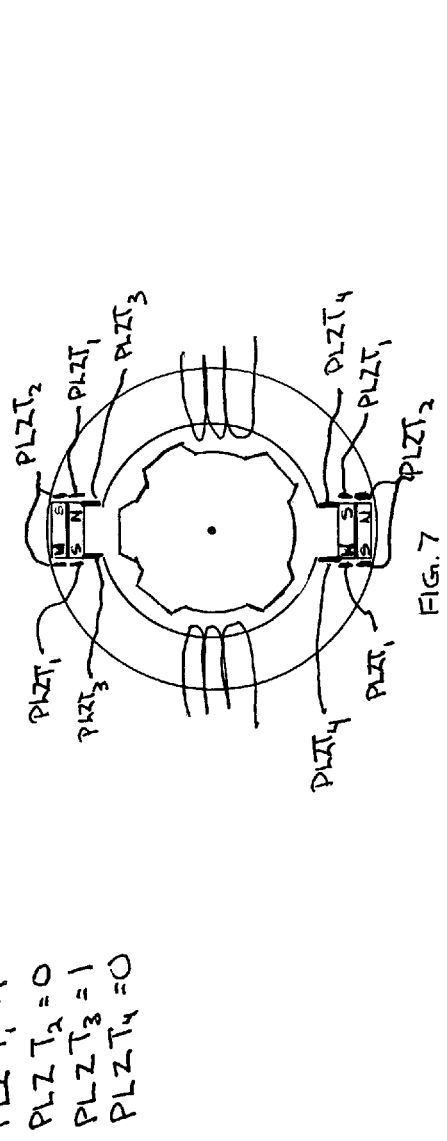

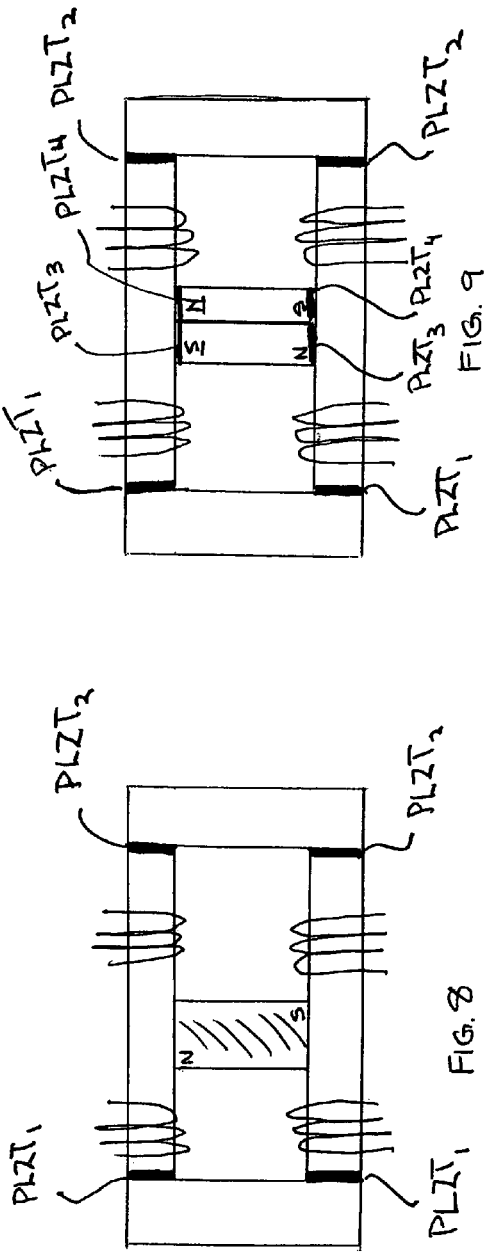
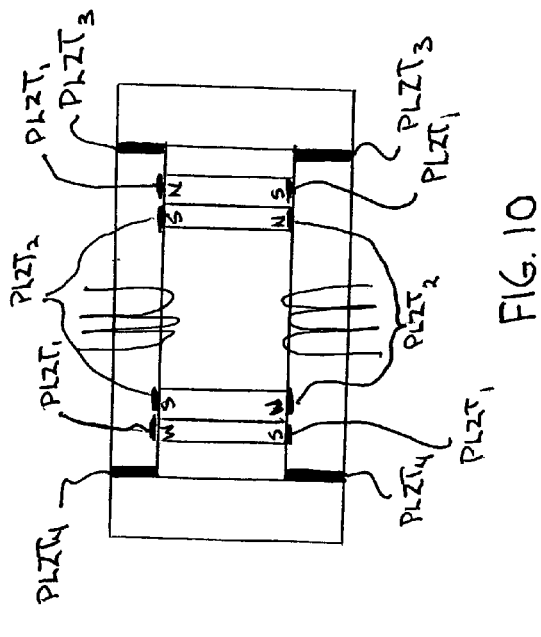
FIG. 8
FIG. 9
FIG. 10

METHOD AND APPARATUS FOR COIL-LESS MAGNETOELECTRIC MAGNETIC FLUX SWITCHING FOR PERMANENT MAGNETS

This application is a continuation of application Ser. No. 10/862,776 filed Jun. 7, 2004, now U.S. Pat. No. 6,946,938 issued Sep. 20, 2005.

FIELD OF THE INVENTION

The present invention relates generally to magnetic fields from permanent magnets and the control of such magnetic fields for use in motors, generators and the like. More particularly, the present invention relates to methods and apparatus that employ a coil-less magnetoelectric (ME) magnetic flux switching construct to repeatedly switch magnetic flux from at least one permanent magnet for the purposes of generating motive force and/or electrical energy.

BACKGROUND OF THE INVENTION

The basic electromechanical processes involved in motors and generators are well-known. Mechanical power is produced (in the case of a motor) or electrical energy is generated (in the case of a generator) by the interaction of the electromagnetic forces between the rotor and stator. While almost all conventional motors utilize electromagnetic forces produced by running current through a series of windings in the form of coils of wire to generate the electromagnetic field that turns the rotor, the design of motors powered by magnetic fields from permanent magnets date back to as early as the 1840's. For numerous reasons, such permanent magnet powered motors have not been practical or competitive when compared to conventional electrical motors powered by electromagnetic fields. For general background information on permanent magnets and permanent magnet motor design, reference is made to Moskowitz, Permanent Magnet Design and Application Handbook (1976), Hanselman, Brushless Permanent Magnet Motor Design (2003), and Gieras et al., Permanent Mamet Motor Technology Revised (2003).

Recently a permanent magnet powered motor construct has been proposed that overcomes many of the challenges long associated with permanent magnet motors. U.S. Pat. Nos. 6,246,561 and 6,342,746 issued to Flynn describe methods for controlling the path of magnetic flux from a permanent magnet and devices incorporating the same. In these patents, a permanent magnet device includes a permanent magnet having north and south pole faces with a first pole piece positioned adjacent one pole face thereof and a second pole piece positioned adjacent the other pole face thereof so as to create at least two potential magnetic flux paths. A first control coil is positioned along one flux path and a second control coil is positioned along the other flux path, each coil being connected to a control circuit for controlling the energization thereof. The control coils may be energized in a variety of ways to achieved desirable motive and static devices, including linear reciprocating devices, linear motion devices, rotary motion devices and power conversion.

It has long been known that certain materials commonly referred to as liquid crystals can be oriented by a magnetic field. As early as 1894, Curie stated that it would be possible for an asymmetric molecular body to polarize in one direction under the influence of a magnetic field. The practical application of this effect is most commonly seen in magnetically ordered crystals even in conditions of symmetry of the molecules of the crystal. U.S. Pat. No. 4,806,858, for example, describes an inspection technique for magnetization that utilizes liquid crystal material to determine whether a sample has been appropriately magnetized. The use of a liquid crystal layer to change the magnetic flux resistance of a single magnetic path was described in Japanese Abstract No. 621 17757A2 (1985).

More recently, the magnetoelectric effects of liquid crystal materials in the form of magnetorestrictive and piezo-electric materials have been the subject of renewed research and development. Generally referred to as magnetoelectric (ME) materials, the research and development into various properties of these ME materials are described, for example, in Ryu et al, "Magnetoelectric Effect in Composites of Magnetorestrictive and Piezoelectric Materials," Journal of Electroceramics, Vol. 8, 107–1 19 (2002), Filipov et al, "Magnetoelectric Effects at Piezoresonance in Ferromagentic-Ferroelectric Layered Composites," Abstract, American Physical Society Meeting (March 2003) and Chang et al., "Magneto-band of Stacked Nanographite Ribbons," Abstract, American Physical Society Meeting (March 2003).

While many of the properties of ME materials are understood and there are numerous applications for the use of such liquid crystal materials, there is nothing which suggests how to make effective use of ME materials in the context of the design of permanent magnet motors and the like.

SUMMARY OF THE INVENTION

The present invention employs a coil-less magnetoelectric (ME) magnetic flux switching construct to repeatedly switch magnetic flux from at least one permanent magnet for the purposes of generating motive force and/or electrical energy. In one embodiment, a pair of permanent magnets are similarly oriented with each pole operably adjacent an associated first and second magnetic flux conductor. A first pair of coil-less ME magnetic flux switches are positioned between a corresponding first end of the first and second magnetic flux conductors and a third magnetic flux conductor. A second pair of coil-less ME magnetic flux switches are positioned between a corresponding second end of the first and second magnetic flux conductors and a fourth magnetic flux conductor. The first and second pairs of coil-less ME magnetic flux switches are repeatedly, alternately enabled to permit magnetic flux from the permanent magnets to cyclically flow through the third magnetic flux conductor and then the fourth magnetic flux conductor. Preferably, the coil-less ME magnetic flux switches are comprised of a laminate magnetoelectric (ME) material controlled by applying a voltage across the material to switch the magnetic conductivity of the ME material.

In one rotary motor embodiment of the present invention, the third and fourth magnetic flux conductors are different regions of a single rotor. The first and second magnetic flux conductors along with the permanent magnets serve as the stator. By continuous switching of the magnetic flux using the pair of coil-less ME magnetic flux switches, rotational motive force is applied to the rotor and a rotary motor is created.

In another rotary motor embodiment of the present invention, the rotor is provided with the permanent magnets and the coil-less ME magnetic flux switches and the stator is the common element that provides the different regions for the third and fourth magnetic flux conductors. In one version of this embodiment, the rotor may be the rotating element of the motor. In another version of this embodiment, the stator may be the rotating element of the motor.

In one rotary motor/generator embodiment of the present invention, one or more pickup coils are wound around at least one of the magnetic flux conductors of the stator element of a rotary motor. Unlike the motor construct of U.S. Pat. Nos. 6,246,561 and 6,342,746, current is not applied to any of these coils. Instead, the coils are used as the pickup coils of an alternating current generator. In an alternate embodiment of this invention, a current may be applied to the coils to utilizes these coils as control coils to enhance or supplement the magnetic flux switching effected by the coil-less ME magnetic flux switches as described by the present invention, or to provide additional operational benefits to the magnetic flux switching constructs as described in this invention and/or U.S. Pat. Nos. 6,246,561 and 6,342,746.

In one solid state generator embodiment of the present invention, a pickup coil is wound around at least one of the first and second magnetic flux conductors of a given solid state flux switching construct. In one version of this solid state generator embodiment, at least one of the first and second magnetic flux conductors having a pickup coils is shared by two or more solid state flux switching constructs. In another version of this solid state generator embodiment, a pickup coil is wound around at one of the third and fourth magnetic flux conductors of a given solid state flux switching construct and at least one of the third and fourth magnetic flux conductors are shared by two or more solid state flux switching constructs.

In another embodiment of a solid state generator in accordance with the present invention, a permanent magnet is at least partially coaxially surrounded by at least one coil-less ME magnetic flux switch with at least one coil positioned outside the coil-less magnetic flux switch. In a first version of this embodiment, the coil is wrapped coaxially with the permanent magnet and the coil-less magnetic flux switch. In a second version of this embodiment, the coil is positioned transverse to a longitudinal axis of the permanent magnet. In a third version of this embodiment, the coil is wrapped as one or more torroids positioned around the permanent magnet.

In another embodiment, at least one permanent magnet has each pole operably adjacent an associated first and second magnetic flux conductor. The first and second magnetic flux conductors each include a pair of selectively enabled permanent magnets with opposite pole orientations. Each permanent magnet in the first and second magnetic flux conductor is selectively enabled in this embodiment by a corresponding pair of coilless magnetic flux switches interposed between the poles of each of these magnets and the corresponding adjacent portions of the first and second magnetic flux conductors. In one version of this embodiment, the pair of magnets in the first and second magnetic flux conductors can be separated with a magnetic insulator material such as MU metal. In another embodiment, a third and fourth magnetic flux conductor can be added to the corresponding end of the first and second magnetic flux conductors with an additional set of interposed coil-less magnetic flux switches arranged as described in the preferred embodiment.

In a linear motor/actuator embodiment in accordance with the present invention, the third and fourth magnetic flux conductors are effectively rails along which a shuttle is moved between carrying the permanent magnets, the first and second magnetic flux conductors and the coil-less ME magnetic switches.

In a preferred embodiment, the coil-less ME magnetic flux switches are implemented as a liquid crystal ME material that is electronically controllable. In an alternate embodiment, the ME material may be physically or optically controllable. Preferably, the ME material is processed onto a desired surface of the magnetic flux conductor or permanent magnet by thin film deposition, sputtering, or other thin film processing techniques. Alternatively, the ME material may be positioned physically interposed between the desired surfaces of the magnetic flux conductors or permanent magnets. In one embodiment, an index matching coating material may be interposed between the ME material and the desired surface of the magnetic flux conductors or permanent magnets to improve the magnetic flux characteristics of the completed construct. In another embodiment, a magnetic insulator material, such as MU metal can be used to house an entire magnetic flux switching construct to prevent external magnetic fields or may be used to magnetically isolate selected portions of a magnetic flux switching construct.

BRIEF DESCRIPTION OF THE DRAWINGS

FIG. 5 is a schematic diagram of an alternative embodiment of a magnetic flux switching construct in accordance with the present invention.

FIGS. 6 and 7 are schematic diagrams of alternate embodiments of a motor/generator in accordance with the present invention.

FIGS. 8, 9 and 10 are schematic diagrams of alternative embodiments of a magnetic flux switching construct in accordance with the present invention.

DETAILED DESCRIPTION OF THE DRAWINGS

Figure 1:
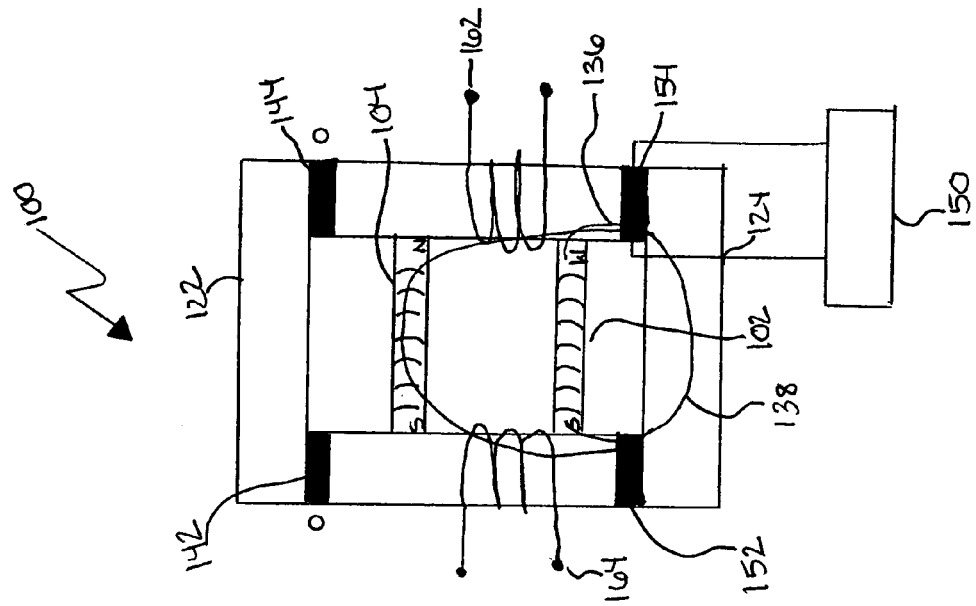
FIGS. 1 and 2 are schematic diagrams of a preferred embodiment of magnetic flux switching construct in accordance with the present invention.
Figure 2:
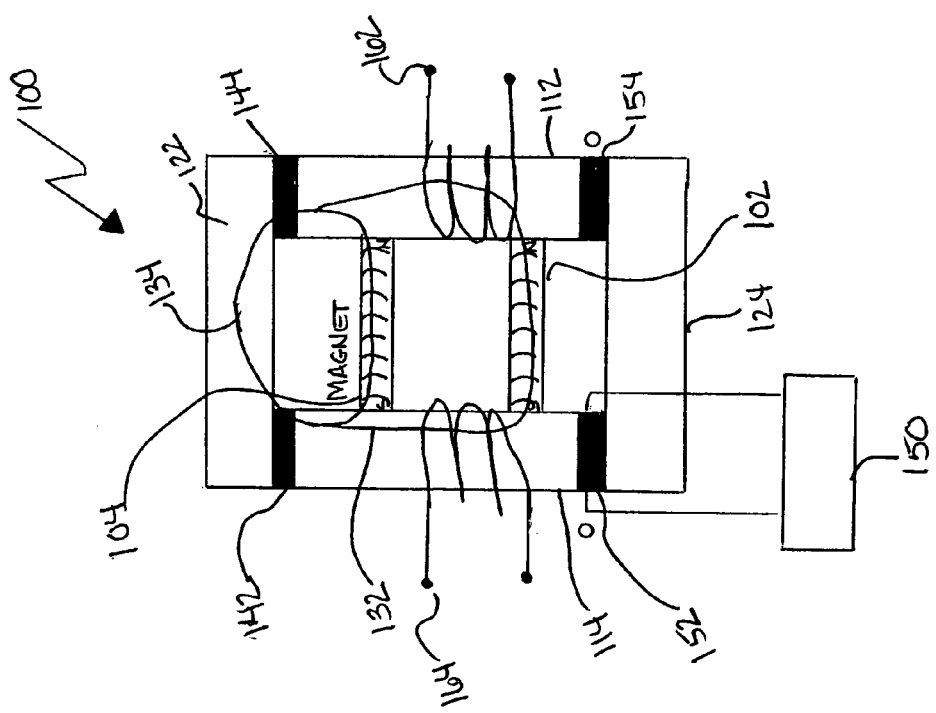

Referring to FIGS. 1 and 2, a first embodiment of the of a magnetic flux switching construct 100 in accordance with the present invention will be described. A pair of permanent magnets 102, 104 are similarly oriented with each north pole (N) operably adjacent a first magnetic flux conductor 112 and each south pole (S) operably adjacent a second magnetic flux conductor 114. Preferably, the permanent magnets 102, 104 are high strength ceramic or rare-earth permanent magnets such as neodidium, although any material capable of being magnetized and retaining that magnetization for a period of time sufficient for the intended use of the construct 100 could be used. Preferably, the magnetic flux conductors 112, 114 are low loss magnetic flux laminate materials, such as hyperco or an MD grade metal, although any iron, steel or ferrous alloy could be used provided that the magnetic flux loss of such material is within the design parameters of the strength of magnetic flux to be switched by the construct 100.

A first pair of coil-less magnetoelectric (ME) magnetic flux switches 142, 144 are sandwiched between a corresponding first end of the first and second magnetic flux conductors 112, 114 and a third magnetic flux conductor 122. A second pair of coil-less ME magnetic flux switches 152, 154 are positioned between a corresponding second end of the first and second magnetic flu conductors 112, 114 and a fourth magnetic flux conductor 124. Preferably, each of the first and second pairs of coil-less ME magnetic flux switches 142, 144, 152, 154 are repeatedly, alternately enabled by an electronic control circuit 150 (shown for convenience as connected to just one switch). Preferably, the coil-less ME magnetic flux switches 142, 144, 152, 154 are comprised of a laminate magnetoelectric (ME) material such as the ME materials described in Ryu et al, "Magnetoelectric Effect in Composites of Magnetorestrictive and Piezoelectric Materials," Journal of Electroceramics, Vol. 8, 107–1 19 (2002). Alternatively, the ME materials may be any ME or liquid crystal material.

As shown in FIG. 1, the switching of the first pair of coil-less ME magnetic flux switches 142 and 144 into an "on" position and the second pair of coil-less ME magnetic flux switches 152 and 154 into the "off" position permits magnetic flux as shown at 132, 134 from the permanent magnets 102, 104 to flow through the third magnetic flux conductor 122 and not the fourth magnetic flux conductor 124. Switching of the first pair of coil-less ME magnetic flux switches 142 and 144 into an "off" position and the second pair of coil-less ME magnetic flux switches 152 and 154 into the "on" position then permits magnetic flux as shown at 136, 138 from the permanent magnets 102, 104 to flow through the fourth magnetic flux conductor 124 and not the third magnetic conductor 122.

As this switching process is cyclically repeated under control of control circuit 150, the switching of the magnetic flux between the positions at 132, 134 and the positions at 136, 138 is accomplished. As will be described, there are numerous applications for this switching construct 100. In the case of the embodiment shown in FIGS. 1 and 2, a pair of pickup coils 162, 164 are wound around the first and second magnetic flux conductors 112, 114, respectively. Electricity is generated at these pickup coils by virtue of the switching magnetic flux. It will be seen that an AC output signal is generated at the terminals of the pickup coils with a frequency that is dependent upon the speed at which the switching process is cycled. The frequency is limited by the switching speeds of the specifications of the particular coil-less ME magnetic flux switches utilized. In a preferred embodiment of a laminate coil-less ME magnetic flux switch, switching frequencies may be up to 100 GHz. It will be apparent that numerous rectification, power conditioning and other signal processing techniques can be used to modify the output of the pickup coils 162, 164. In one embodiment, at least a portion of the output of the pickup coils 162, 164 is used to power the control circuit 150.

Figure 3:
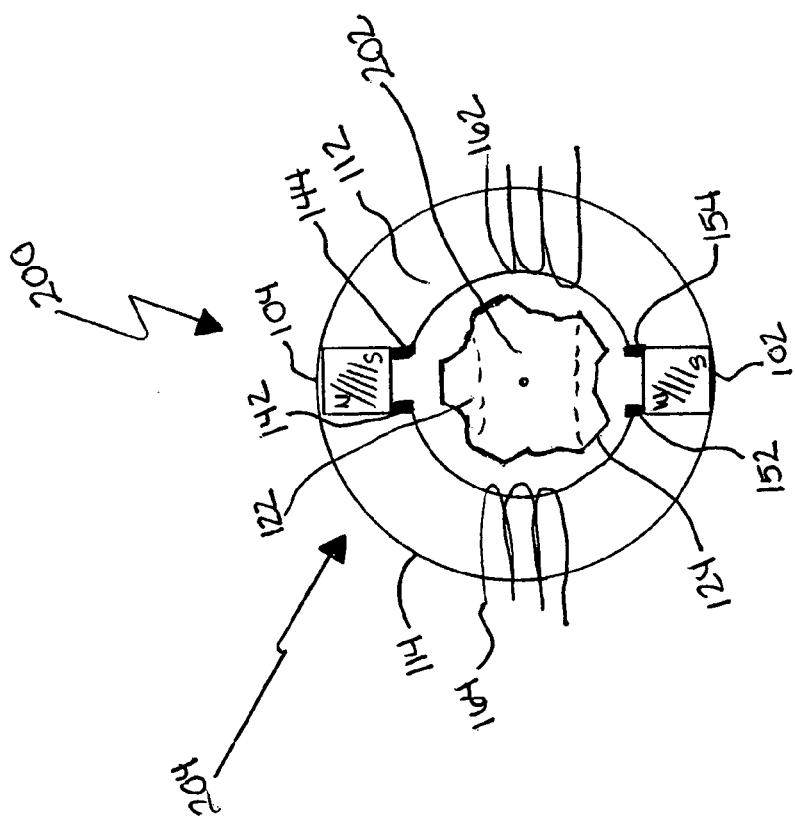
FIG. 3 is a schematic diagram of one embodiment of a motor/generator in accordance with the present invention.

Referring now to FIG. 3, the use of the magnetic flux switching construct of the present invention in a rotary motor application will be described. In general, the arrangement of components in this embodiment is similar to the rotary motors as described in U.S. Pat. Nos. 6,246,561 and 6,342,746, except that no control coils are used to control switching of the magnetic flux. The rotary motor 200 includes components that are similar to those used in the magnetic flux switching construct 100 except that the third magnetic flux conductor 122 and fourth magnetic flux conductor 124 are different regions of a single rotor element 202. Preferably, the rotor element 202 includes a number of notches 210 that are dimensioned to permit the selectively coupling of the magnetic flux through the enabled pair of switches 142, 144 or 152, 154 in a timed manner to generate an effective rotating force in one rotational direction. The first and second magnetic flux conductors 112, 114 are curved and along with the permanent magnets 102, 104 serve as the stator 204 of the rotary motor 200. By continuous switching of the magnetic flux using the pair of coil-less ME magnetic flux switches 142, 144 and 152, 154, rotational motive force is applied to the rotor 202. It will be seen that a rotary motor 200 having any even number of poles could be constructed, such as a six pole motor or a twelve pole motor, for example. For a detailed understanding of the timing and construction of a control circuit that would enable the switches 142, 144, 152, 154, reference is made to U.S. Pat. Nos. 6,246,561 and 6,342,746.

Figure 4:
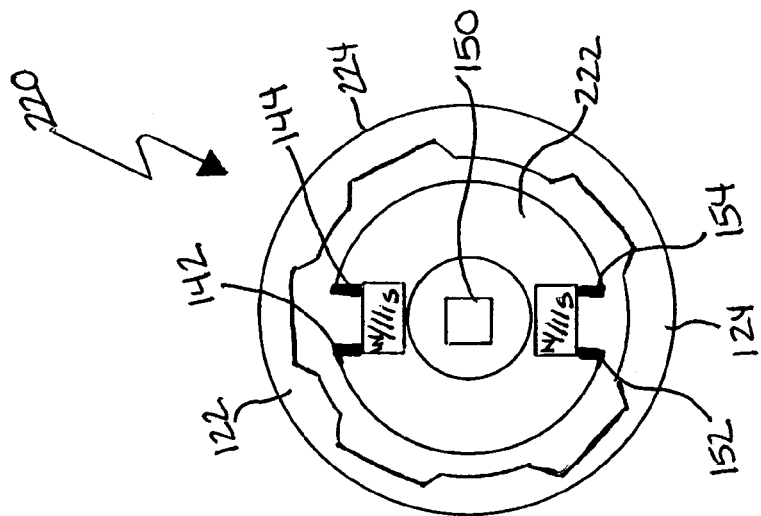
FIG. 4 is a schematic diagram of an alternate embodiment of a rotary motor in accordance with the present invention.

In another embodiment of a rotary motor 220 as shown in FIG. 4, the rotor 222 is provided with the permanent magnets and the coil-less ME magnetic flux switches 142, 144, 152, 154 and the stator 224 is the common element that provides the different regions for the third and fourth magnetic flux conductors 122, 124. In one version of this embodiment, the rotor 222 may be the rotating element of the motor 220. In another version of this embodiment, the stator 224 may be the rotating element of the motor 220. In one embodiment, the control circuit 150 can be carried by the rotor 222 and may be powered by a battery or by a shaft feed powered by pickup coils or an outside source.

In one rotary motor/generator embodiment as shown in FIG. 3, one or more pickup coils 162, 164 are wound around at least one of the first and second magnetic flux conductors 112, 1 14 of the stator 204 of rotary motor 200.

In another embodiment as shown in FIGS. 5–7, at least one permanent magnet has each pole operably adjacent an associated first and second magnetic flux conductor. In one embodiment, the first and second magnetic flux conductors each include a pair of selectively enabled permanent magnets with opposite pole orientations. Each permanent magnet in the first and second magnetic flux conductor is selectively enabled in this embodiment by a corresponding pair of coil-less magnetic flux switches interposed between the poles of each of these magnets and the corresponding adjacent portions of the first and second magnetic flux conductors. In one version of this embodiment, the pair of magnets in the first and second magnetic flu conductors can be separated with a magnetic insulator material such as MU metal. In another embodiment, a third and fourth magnetic flux conductor can be added to the corresponding end of the first and second magnetic flux conductors with an additional set of interposed coil-less magnetic flux switches arranged as described in the preferred embodiment. This construct can be used to create a rotary motor/generator as shown in FIGS. 6–7, with any number of pickup coils.

In another embodiment as shown in FIG. 8, a single permanent magnet is used to provide magnetic flux for the magnetic flux switching construct and multiple pick up coils are arranged on each of the first and second magnetic flux conductors.

In another embodiment as shown in FIG. 9, a pair of permanent magnets are used to selectively provide magnetic flux with a second set of coil-less ME magnetic flux switches interposed in between the poles of each of the permanent magnets and the first and second magnetic flux conductors. This second set of coil-less ME magnetic flux switches may be controlled by the control circuit for the first set of coil-less ME magnetic flux switches that selectively flux connect the third and fourth magnetic flux conductors or may be controlled by a separate control circuit. FIG. 10 is an alternate embodiment of the embodiment shown in FIG. 9 with a pair of paired and coil-less ME magnetic flux switched set of permanent magnets used to generate magnetic flux for the present invention.

Figure 12:
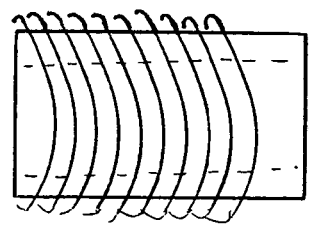
FIG. 12 is a side view of the embodiment shown in FIG. 11.
Figure 14:
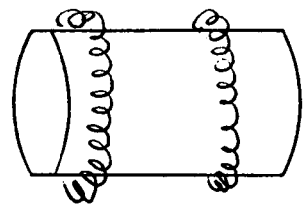
FIG. 14 is a side view of an embodiment of a coaxial construction of a generator in accordance with the present invention.
Figure 11:
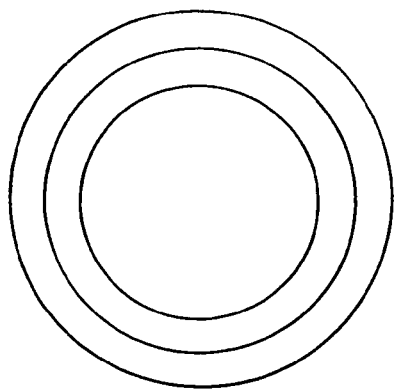
FIG. 11 is a top plan view of a coaxial construction of a generator in accordance with the present invention.
Figure 13:
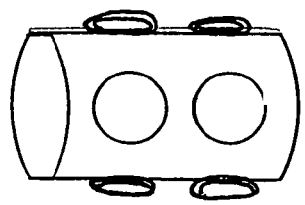
FIG. 13 is a side view of an alternate embodiment of a coaxial construction of a generator in accordance with the present invention.

In another embodiment of a solid state generator as shown in FIGS. 11–14, a permanent magnet is at least partially coaxially surrounded by at least one coil-less ME magnetic flux switch with at least one coil positioned outside the coil-less magnetic flux switch. In a first version of this embodiment as shown in FIGS. 11 and 12, the coil is wrapped coaxially with the permanent magnet and the coil-less magnetic flux switch. In a second version of this embodiment as shown in FIG. 13, the coil is positioned transverse to a longitudinal axis of the permanent magnet. In a third version of this embodiment as shown in FIG. 14, the coil is wrapped as one or more torroids positioned around the permanent magnet.

Figure 16:
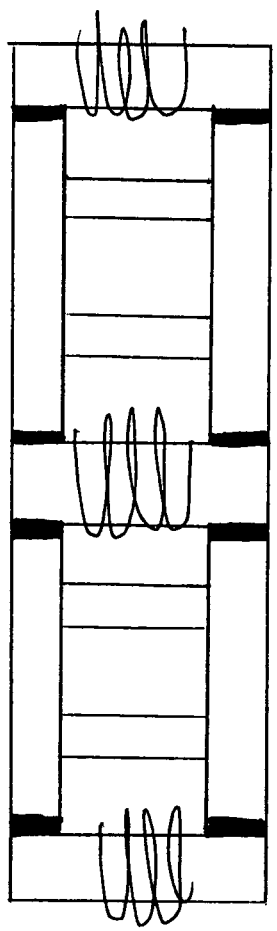
FIGS. 15 and 16 are schematic views of alternate embodiments of multiple flux switching constructs in accordance with one embodiment of the present invention.
Figure 15:
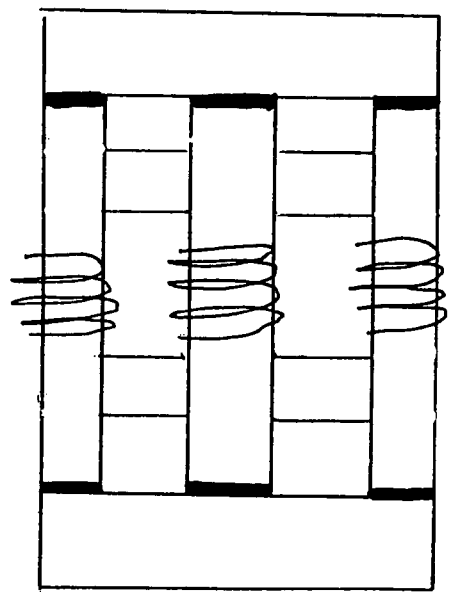

In a solid state generator embodiment of the present invention as shown in FIG. 15, a pickup coil is wound around at least one of the first and second magnetic flux conductors of a given solid state flux switching construct. In this embodiment, at least one of the first and second magnetic flux conductors having a pickup coil is shared by two or more solid state flux switching constructs. In another version of this solid state generator embodiment as shown in FIG. 16, a pickup coil is wound around at one of the third and fourth magnetic flux conductors of a given solid state flux switching construct and at least one of the third and fourth magnetic flux conductors are shared by two or more solid state flux switching constructs.

Figure 17:
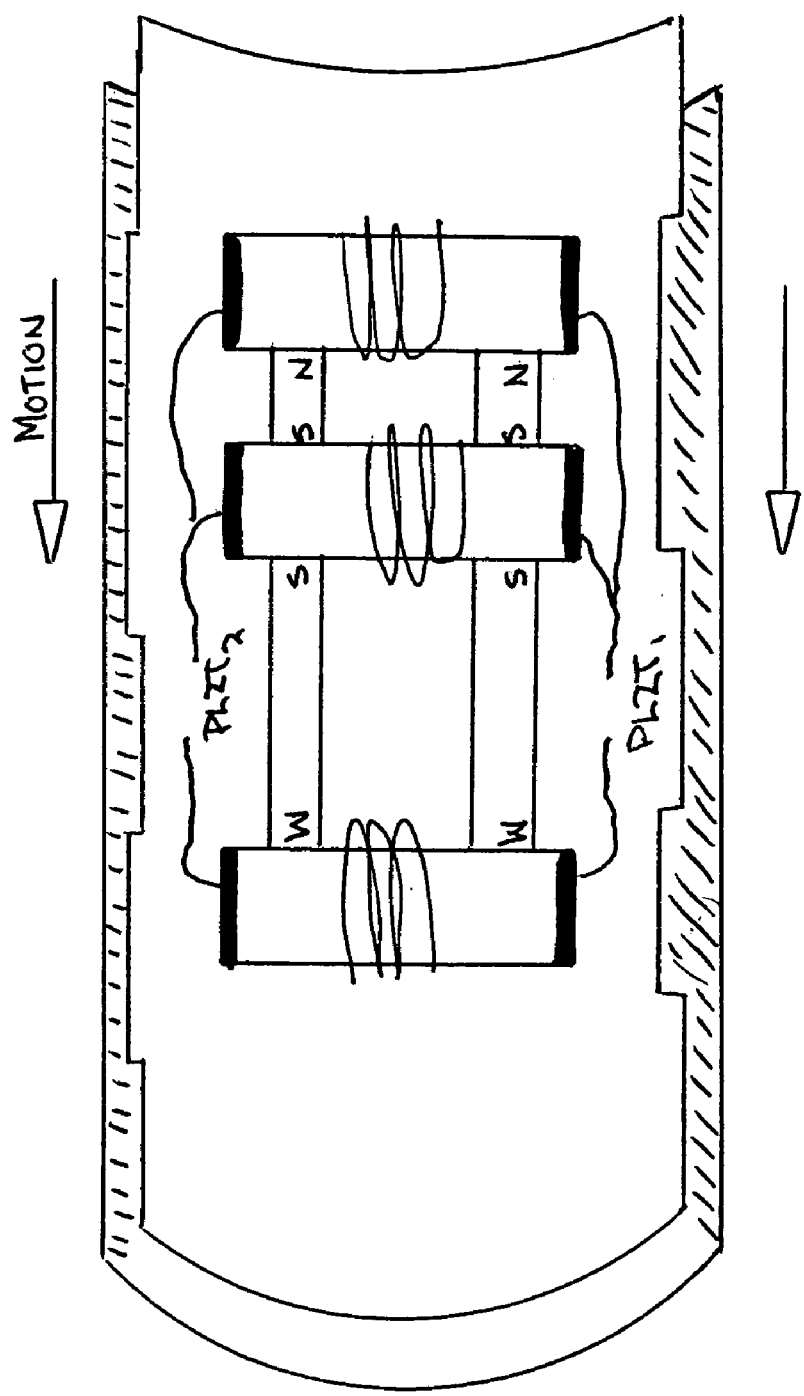
FIG. 17 is a schematic diagram of an alternate embodiment of a linear motor/actuator in accordance with the present invention.

In a linear motor/actuator embodiment in accordance with the present invention as shown in FIG. 17, the third and fourth magnetic flux conductors are effectively rails along which a shuttle is moved between carrying the permanent magnets, the first and second magnetic flux conductors and the coil-less ME magnetic switches. The rails may be tied together as part of a common superstructure. One or more sets of the magnetic flux switching construct may be incorporated into the shuttle portion of this embodiment.

It will be apparent that numerous combinations of the various embodiments of the present invention may be arranged in different combinations to take advantage of different aspects of the present invention.

The complete disclosures of the patents, patent applications and publications cited herein are incorporated by reference in their entirety as if each were individual incorporated. Various modifications and alterations to this invention will become apparent to those skilled in the art without departing from the scope or spirit of this invention.

What is claimed is:

1. An apparatus for switching magnetic flux comprising:
at least a first permanent magnet having a north pole and a south pole;
a first magnetic flux conductor operably connected to the north pole and having at least a first and a second magnetic flux path end;
a second magnetic flux conductor operably connected to the south pole and having at least a first and a second magnetic flux path end;
at least one coil-less magnetoelectric flux switch operably positioned between the corresponding first ends of the first and the second magnetic flux conductors;
at least one coil-less magnetoelectric flux switch selectively operably positioned between the corresponding second ends of the first and the second magnetic flux conductors; and
control circuitry operably connected to the magnetoelectric flux switches to selectively enable magnetic flux from the at least first permanent magnet to flow through the first ends of the first and second magnetic flux conductors and then through the second ends of the first and second magnetic flux conductors.

2. The apparatus of claim 1 wherein the flux conductors are part of a rotary motor powered at least in part by magnetic flux from the at least one permanent magnet.

3. The apparatus of claim 1 further comprising a pickup coil wound around at least one of the flux conductors such that a flow of current is generated in the pickup coil by alternately enabling magnetic flux from the at least first permanent magnet to flow through a third magnetic flux conductor and then through a fourth magnetic flux conductor.

4. The apparatus of claim 1 wherein the coil-less magnetoelectric flux switches are comprised of liquid crystal magnetoelectric material.

* * * * *